UNITED STATES PATENT OFFICE.

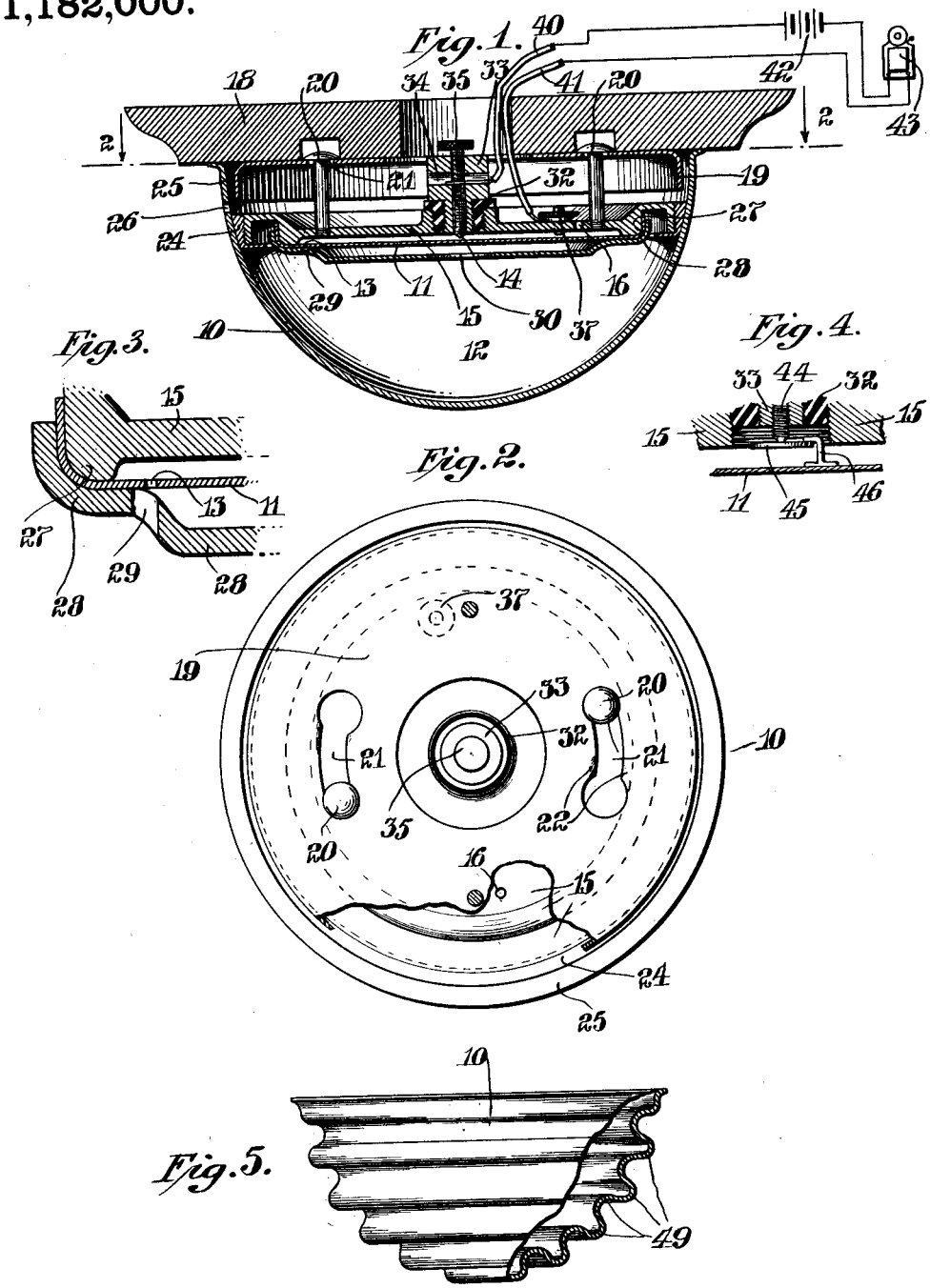

BRUCE V. EDWARDS, OF NEWARK, NEW JERSEY, ASSIGNOR TO EDWARDS ENGINEERING & MANUFACTURING COMPANY, OF NEW YORK, N. Y., A CORPORATION OF NEW JERSEY.

THERMOSTATIC CONTROLLER.

1,182,000.  Specification of Letters Patent.  Patented May 9, 1916.

Application filed March 14, 1914. Serial No. 824,645.

*To all whom it may concern:*

Be it known, that I, BRUCE VINCENT EDWARDS, a citizen of the United States, residing at Newark, in the county of Essex, and State of New Jersey, have invented certain new and useful Improvements in Thermostatic Controllers, of which the following is a specification, reference being had therein to the accompanying drawing.

This invention relates to thermostatic controllers or that class of apparatus operated by temperature changes for operating or otherwise controlling alarm systems, sprinkler systems or any other systems.

More particularly, this invention relates to that class of thermostatic controller which operates by the volumetric changes of an inclosed fluid, for example, atmospheric air, whose expansion and contraction are the direct results of heat applied to or detracted from the body of air.

The general objects of the present invention are to afford a more durable, permanent, efficient, compact, simple and cheap thermostatic controller than those heretofore known.

A specific object hereof is to afford a sensitive and durable thermostatic controller of the type wherein operation is caused by relatively abrupt temperature changes rather than by the actual existing temperature or by any relatively gradual changes therein. By these expressions it will be understood that usually such a thermostatic controller is to be self-adjustable so as to avoid operation upon ordinary climatic changes or ordinary temperature adjustments within a building, whereas for a sudden temperature change, such as the breaking out of a conflagration, the controller will operate to give an alarm, open a water supply or perform other operations.

Other and more specific objects will be illustrated in the hereinafter following description of a particular embodiment of the present invention.

In the accompanying drawings forming a part hereof, Figure 1 is a central section of a thermostatic controller embodying the present invention. For convenience, the apparatus may be considered as attached to the ceiling of a room, so that the figure is a vertical central section. Fig. 2 is a plan view partly in section upon the plane 2—2 of Fig. 1. Fig. 3 is an enlarged detail of a portion of Fig. 1. Fig. 4 is a modified embodiment showing a normally closed instead of a normally open electric controlling circuit. Fig. 5 is a modification as to the form of the expansion chamber.

Similar reference numerals designate corresponding parts in the several figures.

In order to inclose a body of air an air chamber is provided in an apparatus of this kind. This is in effect a fluid-expansion chamber since the operation of the device is due to volumetric expansion or contraction of the fluid in the chamber. In connection therewith is provided some suitable control device operated by volumetric changes of the fluid due to temperature changes outside the chamber, and this device may, for convenience, be illustrated as taking the form of an electric contact device, which affords delicate and easily regulated control, although mechanical and other forms of control device could obviously be used. Apparatuses of this general nature have been already known and it has already been suggested to provide a restricted air escape permitting air to flow to and fro from or into the chamber for equalizing the interior and exterior pressures due to gradual volumetric changes. For example, the rigid wall of the air chamber of the expired patent 370,851 of October 4, 1887, is capable of permitting the slow passage of air owing to the porous nature of the material, while in the analogous structure in expired patent 522,972 of July 17, 1894, a small block of porous material is incorporated in the chamber wall. These and other expedients tried for the purpose have proven objectionable for various reasons including destructibility, obstruction or clogging up of the escape, necessity for difficult regulation, non-durability, difficulty of manufacture or complication of structure.

In the present invention there is provided in connection with the rigid or self-sustaining chamber wall a fluid escape for equalizing gradual volumetric or pressure changes of a novel and extremely simple character, the same consisting of a thin membrane constituting one of the chamber walls, the same punctured with a simple, constantly-open minute aperture. By minute in this connection is meant such a degree of smallness as is scarcely visible by the unaided eye, and the accompanying drawings are necessarily exaggerated. Indeed, the puncture is preferably of such small size that it would be impractical to produce excepting in the extremely thin preferably metallic membrane referred to. The puncture is so small that, while permitting passage of air to equalize pressures for ordinary daily temperature changes, it serves without the need of valve or other movable part or obstruction of any nature to restrict the air flow that would be necessary to equalize pressures in the case of an abrupt temperature and volume change owing, for instance, to a conflagration. By a thin membrane is meant preferably a sheet of metal, such as copper, of such extreme thinness as to be capable of receiving the minute puncture referred to and of thus affording an air escape passage having substantially no degree of length, but serving to effect restriction by the smallness of the puncture. Such a membrane will necessarily be of a flexible nature if not rigidly mounted in the apparatus. Such an air escape, unlike a porous wall or pad, is free from liability to deteriorate, is simple to construct so as to afford a given restriction to air flow and is simple and easy to incorporate in the apparatus. Also the present air escape is differentiated from a vent-tube which, owing to its substantial length, is subject to clogging and filling up and requires regulation. Similarly, such air escape is differentiated from any valve-controlled tube or opening and from any apparatus involving the use of screws or other movable parts and, indeed, from any air escape passage formed in or by any rigid part not having the character of the thin membrane hereof.

Referring to the drawings, a substantially rigid hollow casing or chamber wall 10 is shown. This is preferably hemispherical, giving sightliness, strength and requisite interior volume. In connection with the casing or chamber wall 10 is shown a membrane 11, the two forming between them the air expansion chamber 12. Preferably the casing 10 is wholly closed except at the position of the membrane 11, although it might take various shapes or even have extended arms, branches, tubes or ribs. The chamber 12 is full of fluid, preferably air, and the wall 10, while rigid, is sufficiently thin to quickly transmit heat, so that the interior air will change volume readily in response to outside temperature changes.

The membrane 11 is indicated in an exaggerated way as having a minute puncture at 13, this puncture being constantly open, but of such small size as to restrict the air flow therethrough, it serving to equalize internal and external pressure excepting upon abrupt temperature and volume changes.

Owing to the described advantages of this form of air escape, great sensitiveness is insured and, therefore, the size of the air chamber and that of the entire apparatus may be materially reduced, thus adding cheapness to simplicity and rendering the apparatus less objectionably apparent.

A suitable control device, such as the device 14, may be employed, this being adapted to be operated by abrupt temperature changes, so as to give an indication or alarm or set a sprinkler system into operation. The device 14 may be operated by the movement of a flexible diaphragm forming one of the chamber inclosing walls.

Another advantage of the present improvement is now perceivable in that the punctured membrane before referred to and the controller operating diaphragm may be combined into one and the same part. Thus, in the drawings the minute puncture 13 is shown formed directly in the extremely thin metallic diaphragm 11, which is movable upon abrupt temperature and volume changes so as to effect the operation of the control device 14. This result in turn has the further advantage that the puncture leads from the air chamber 12 directly into the recess at the outer side of the diaphragm, this recess, therefore, serving as a protecting means not only preventing mechanical injury to the thin diaphragm but assisting to exclude dirt and moisture from access to the puncture. By recess is meant a space not entirely closed, but having a free communication to atmosphere. By chamber, on the contrary, is meant a substantially closed space lacking any free inflow and outflow.

It is found that the extremely thin copper membrane, when punctured, forms a durable air escape and is not subject to corrosion or other deterioration, especially when mounted in the protected manner described.

The device 14 may be one of two electrical contacts, the other, for convenience, consisting of the diaphragm 11. As shown in Fig. 1, an abrupt temperature rise owing to a conflagration will swell outward the diaphragm 11 beyond the capability of the air escape 13 to equalize pressures and thus cause contact between the diaphragm 11 and contact 14, so as to close a controlling electric circuit.

Having described the more important features of construction and operation, the preferred details of structure will now be described.

Support for the described elements, 10, 11, 12, 13 and 14, may be suitably provided, for example by a frame shown in the form of a circular plate 15. It is desired that there shall be no accumulated air pressure outside the diaphragm 11 to impede its movement, and frame 15 is therefore formed with an unrestricted fluid aperture 16 leading from the space between the frame and the diaphragm to the external atmosphere. The aperture 16 is shown far removed from the position of the puncture 13 so as to minimize the possibility of foreign matter reaching the puncture; and, as will be hereinafter seen, this possibility is further taken care of by totally excluding entrance of foreign matter. The circular frame plate 15 is shown as detachably supported from a wooden base or fixture 18, namely, by means of a peripherally flanged lock plate 19, permanently mounted on the base 18, and a pair of pins 20 on the frame piece 15, the heads of such pins adapted to be engaged with and disengaged from keyhole slots 21 in the lock plate 19 and such slots having offset edges 22 tending to wedge and thereby more surely prevent accidental detachment.

Instead of attaching the punctured movable diaphragm directly to the convex shell or casing 10, it is preferred to attach both of them to the frame plate 15 whereby, on detaching the shell, the interior is opened to access and inspection, and the greatest efficiency of mounting of the parts is secured.

The casing or shell 10 may be connected to the frame plate 15 as follows. The two are shown circular so that they may be engaged by screw threads permitting easy disengagement, yet solid, permanent and airtight attachment. To this end the casing has secured or soldered within it an annular threaded and flanged ring 24. Beyond or above the ring 24 the shell 10 is continued in the form of an extension 25 substantially meeting and contacting the base 18, thus inclosing a circular space or recess between the base and the frame plate. An unrestricted opening 26 is provided in the extension 25, this opening coöperating with the opening 16 in the frame plate, so as to give free communication between the atmosphere and the recesses above the diaphragm. It will be noted that moisture or foreign matter, in order to reach the puncture 13, must pass through the tortuous course from the opening 26 entirely across the recess between the frame and base, thence through the opening 16 in the frame and thence entirely across the recess between the frame and diaphragm. Thus very effective protection to the diaphragm and puncture is afforded.

The diaphragm may be mounted upon the frame plate by means of an annular downward flange 27 formed on the latter in connection with a locking ring or cap 28 which, in the process of assembling the parts, is forced over the frame flange, so as to stretch and tightly secure the diaphragm between them, aided by the application of cement if desired. For convenience, the puncture 13 may be located near one marginal edge of the diaphragm, as shown, and, in order that the locking cap 28 may in no way obstruct its action, a substantial opening 29 may be formed, as shown, in the locking cap opposite the puncture. The puncture, which may be formed by means of an extremely minute needle, may be produced after the assemblage of the parts 15, 11, and 28 by inserting the needle through the opening 29.

The locking ring or cap 28 is not intended to in any way affect air movements, and its central portion may have a large opening 30 opposite the central portion of the diaphragm. Owing to the diaphragm being connected to the downward flanges of the frame plate, the recess before referred to is constituted between the diaphragm and frame plate.

The control device referred to may be conveniently supported upon the frame plate 15, as follows. The flanged and threaded central opening of the frame plate 15 may have engaged within it an insulating bushing 32, also interiorly threaded and engaged within it by a sleeved block 33, which is centrally bored and threaded to receive the adjustable contact device 14. According to the degree of responsiveness desired, the screw contact 14 may be adjusted nearer to or farther from the metallic diaphragm 11.

At the upper part of the block 33 is a wire recess 34 coöperating with a binding screw 35 so as to secure an electrical conductor in circuit with the contact 14.

To complete the circuit a binding screw 37 may be provided on the frame plate 15; a conductor 40 from the binding screw 35 and a conductor 41 from the binding screw 37 leading, for example, to a battery 42 and alarm 43, conventionally indicated as representing any form of apparatus or system controlled by the control device 14.

Since it is sometimes preferred to maintain a normally closed rather than an open electric circuit, a simple modification for that purpose is indicated in Fig. 4, wherein the control device 14 is replaced by a control device 44 differing from the former in having a disk 45 at its lower end adapted to be raised and lowered by adjustment and adapted to be normally contacted at the upper side of its periphery by an inverted contact 46 projecting hook-like from the diaphragm 11. With this arrangement, upon abrupt temperature and pressure increase, the diaphragm lifts the contact 46 from the disk 45, thus breaking the circuit and thus, for example, releasing a magnetically held armature, whose fall sets suitable alarms or other devices into operation.

It has already been explained how the volume of the air chamber 12 is reduced in size owing to the advantageous nature of the combined diaphragm and air escape; and the size may be still further reduced and the same responsiveness maintained by constituting the hemispherical casing or shell 10 out of corrugated metal. Thus, in Fig. 5, is shown such a casing having the corrugations 49, which not only increase the surface for transmission of exterior heat, but also give added strength to the shell against injury or distortion.

It will thus be seen that thermostatic controllers have been illustrated and described embodying the principles and attaining the objects and advantages before set forth and other advantages pertaining to the described structures will be apparent to those skilled in the art.

Since many matters of arrangement, design, detail and other features may be variously modified without departing from the novel principles involved, no limitation to such features is intended excepting so far as set forth in the appended claims.

What is claimed is:

1. A thermostatic controller including in combination a hollow shell, a diaphragm forming with said shell an expansion chamber, a frame having a free opening and forming with said diaphragm a protective recess, a base spaced from said frame, a shell extension having a free opening and forming with said frame and base a second protective recess, and a control device operated by diaphragm movement upon volumetric change in said chamber, said diaphragm formed with a constantly-open but restricted pressure-equalizing aperture, whereby only abrupt temperature changes are effective to operate said control device.

2. A thermostatic controller including in combination a base and a hollow shell, the two concealing all of the following elements, a minutely punctured thin diaphragm spaced from said base and forming with said shell an expansion chamber, and a control device between base and diaphragm operated by diaphragm movement upon volumetric change in said chamber, a frame forming a mutual connecting means between said base, shell, diaphragm and control device.

3. A thermostatic controller including in combination a base and a hollow shell, the two concealing all of the following elements, a punctured diaphragm spaced from said base and forming with said shell an expansion chamber, and a control device between base and diaphragm operated by diaphragm movement upon volumetric change in said chamber, a frame forming a mutual connecting means between said base, shell, diaphragm and control device, and said frame and shell having separated free openings.

4. A thermostatic controller including in combination a rigid corrugated heat-transmitting convex shell, a flexible diaphragm closing the same and a control device operated by diaphragm movement.

5. A thermostatic controller including a frame, a hollow shell, a diaphragm, and a control device, combined as follows: said shell and diaphragm arranged to inclose an expansion chamber, said diaphragm and frame arranged to form a diaphragm protecting recess, said frame formed with an unrestricted opening into said recess, said diaphragm formed with a constantly-open but restricted pressure-equalizing aperture, and said control device arranged to be operated by movement of said diaphragm upon volumetric change in said chamber due to abrupt temperature changes.

6. A thermostatic controller including a frame, a hollow shell, a diaphragm, and a control device, combined as follows: said shell and diaphragm arranged to inclose an expansion chamber, said diaphragm and frame arranged to form a diaphragm protecting recess, said frame formed with an unrestricted opening into said recess, said diaphragm formed with a constantly-open but restricted pressure-equalizing aperture, said shell having an extension forming with said frame a second recess constantly freely open to the atmosphere and said control device arranged to be operated by movement of said diaphragm upon volumetric change in said chamber due to abrupt temperature changes.

7. A thermostatic controller including a base, a frame, a hollow shell, a diaphragm, and a control device, combined as follows: said shell and diaphragm arranged to inclose an expansion chamber, said diaphragm and frame arranged to form a diaphragm protecting recess, said frame formed with an unrestricted opening in said recess, said diaphragm formed with a constantly-open but restricted pressure-equalizing aperture between said chamber and recess, said shell having an extension extending to said base and forming with said base and frame a second recess, and having an unrestricted opening between said second recess and atmosphere, and said control device supported on said frame and arranged to be operated by movement of said diaphragm upon volumetric change in said chamber due to abrupt temperature changes.

In testimony whereof I affix my signature in presence of two witnesses.

BRUCE V. EDWARDS.

Witnesses:
Eugene F. Baerenkodt,
Herbert Dixon.

Copies of this patent may be obtained for five cents each, by addressing the "Commissioner of Patents, Washington, D. C."